United States Patent [19]
Pan et al.

[11] Patent Number: 5,297,155
[45] Date of Patent: Mar. 22, 1994

[54] TUNABLE LASER ASSEMBLY

[75] Inventors: Jing-Jong Pan, Milpitas; Frank Y. F. Liang, San Jose; Xing-Liang Jing, San Jose; Ming Shih, Milpitas, all of Calif.

[73] Assignee: E-Tek Dynamics, Inc., San Jose, Calif.

[21] Appl. No.: 37,859

[22] Filed: Mar. 29, 1993

[51] Int. Cl.[5] .............................................. H01S 3/10
[52] U.S. Cl. ..................................... 372/20; 372/102; 372/107; 372/92
[58] Field of Search ................... 372/92, 102, 20, 107, 372/99

[56] References Cited
U.S. PATENT DOCUMENTS

| | | | |
|---|---|---|---|
| 3,443,243 | 5/1969 | Papel | 372/102 |
| 3,624,551 | 11/1971 | Gudmunsen et al. | 372/102 |
| 4,868,834 | 9/1989 | Fox et al. | 372/20 |
| 5,144,638 | 9/1992 | Davin | 372/107 |

Primary Examiner—Léon Scott, Jr.
Attorney, Agent, or Firm—Townsend and Townsend Khourie and Crew

[57] ABSTRACT

An assembly for tuning a laser by a stepper motor alone is provided. A diffraction grating forming a resonance cavity with an end of the laser is rotated by the stepper motor. A follower arm affixed to the rotatable grating, engages a cam, which is driven by the stepper motor. The cam and follower arm are designed so that there is a linear relationship between the rotation of the stepper motor and that of the grating.

15 Claims, 3 Drawing Sheets

| φ | θ |
|---|---|
| 0 | 0.4864 |
| 10 | 1.0771 |
| 20 | 1.664 |
| 30 | 2.2626 |
| 40 | 2.851 |
| 50 | 3.4525 |
| 60 | 4.051 |
| 70 | 4.6679 |
| 80 | 5.2524 |
| 90 | 5.8467 |
| 100 | 6.4408 |
| 110 | 7.0112 |
| 120 | 7.6375 |
| 130 | 8.2731 |
| 140 | 8.8919 |
| 150 | 9.5227 |
| 160 | 9.9947 |
| 170 | 10.356 |

TUNABLE LASER ASSEMBLY

BACKGROUND OF THE INVENTION

The present invention is related to assemblies for tunable lasers and, in particular, to assemblies for finely tuning a resonance cavity for a laser.

Tunable lasers, i.e., lasers having output wavelengths which can be varied in a controlled manner, have many applications. For example, one such application is for a fiber optic network in which tunable lasers may be used with wavelength dependent multiplexers to direct optical signals to particular points in the network.

Thus, it is very desirable that the laser be tuned accurately. One way of tuning a laser is through the use of a resonance cavity formed by the laser at one end and a diffraction grating at the other end. By carefully rotating the grating, standing waves of a particular wavelength are created in the cavity. In other words, the frequency of the light emitted by the laser is tuned by rotating the grating to select the desired frequency.

Previous ways of rotating the grating have included the use of a piezo-electric ceramic or of a stepper motor. In the latter case, the grating is mounted to the shaft of a stepper motor, which typically has thousands of steps per revolution. This does not provide sufficient resolution, i.e., no better than 1 GHz (due to mode hopping and ppor side-mode suppression) over a wide tuning range. A silica plate between the end of the laser and the refraction grating is used for the fine tuning of the frequency, up to 1 Mhz. Other approaches have included the use of expensive microstepper motors with and without shaft encoders to achieve sufficient discrimination.

SUMMARY OF THE INVENTION

The present invention provides for a novel assembly for tuning a laser mounted to a base. The assembly has a stepper motor mounted to the base, a controller, which is responsive to control signals and connected to the stepper motor, for controlling the rotation of the stepper motor shaft, a cam mounted to the stepper motor shaft, a grating rotatably mounted to the base and positioned with respect to an end of the laser to form an tuning cavity therewith, and a follower arm mounted to said grating and biased against the cam. This assembly permits the cavity to be very accurately tuned to vary the output of the laser by rotating the grating in response to the control signals. The cam is shaped so that there is a linear relationship between the rotation of the stepper motor and the rotation of the grating.

DETAILED DESCRIPTION OF THE PREFERRED EMBODIMENTS

Figure 1:
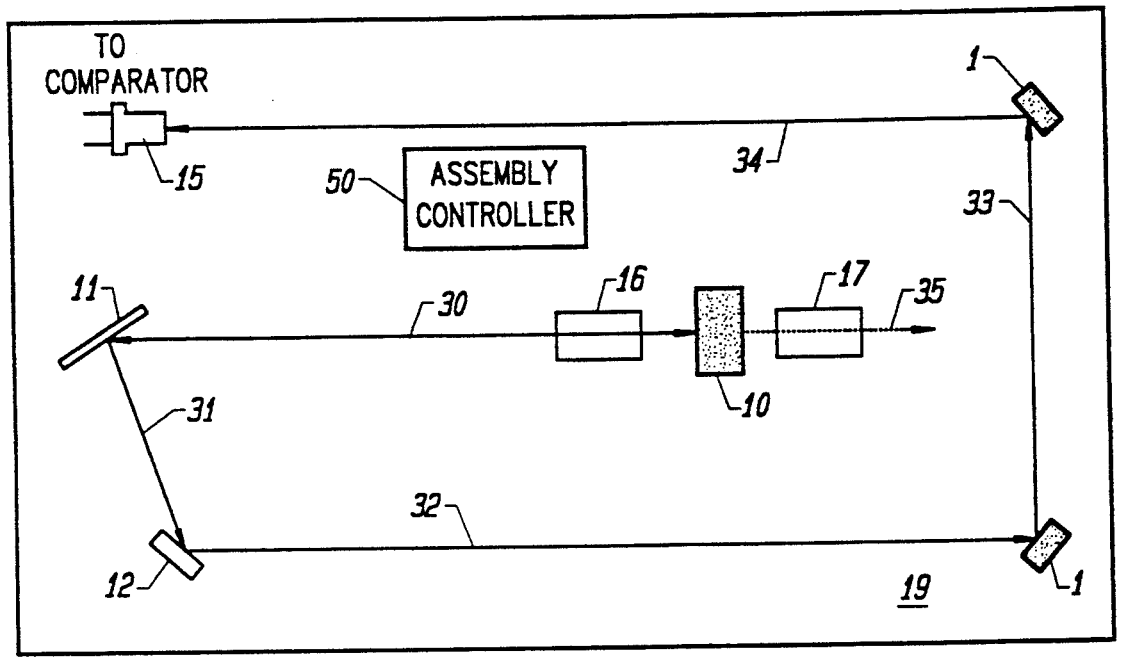
FIG. 1 is a schematic representation of a tunable laser assembly in accordance to an embodiment of the present invention.

FIG. 1 is a representational top view of an assembly according to the present invention. The assembly has a laser 10 with collimators 16 and 17 at either end of the laser 10. The collimator 16 forms part of the resonance cavity for the laser with a diffraction grating 11. A ray 30 indicates the light path in the resonance cavity. For calibration purposes, the assembly also has mirrors 12, 13 and 14, and a photodetector 15, such as a photodiode. Rays 31, 32, 33 and 34 indicate the path of the light from the grating 12 to the photodiode 12. An assembly controller 50 directs the operation of the assembly.

The laser 10, a semiconductor laser, such as a Fabry-Perot type from Oki Semiconductor Co. of Tokyo, Japan, is mounted upon a base 19. The diffraction grating 11, such as a holographic type from Spectrogon Co. of Täby, Sweden, forms the resonance cavity for the laser 10 with the collimator 16 located between the laser 10 and the diffraction grating 11 on the opposite side of the laser 10. The resonance cavity, approximately 10 cm in length and formed between the diffraction grating 11 and the end of the laser 10 facing the grating 11, operates by the reflection of light generated from the laser 10 back from the grating 11. This length is efficacious in providing the proper linewidth of the selected frequency. Too broad a linewidth (by decreasing the length of the cavity) defeats the purpose of a "tunable" laser; too narrow a linewidth (by increasing the length of the cavity) makes the operation too sensitive to disturbances, such as motion and the like. The laser end is covered with an anti-reflection coating with a performance of better than 0.1% reflectivity for good performance.

A small rotation of the grating 11 permits only selected wavelengths to be reflected back toward the laser 10 by the diffraction grating 11. In other words, a standing wave effect is used in the resonance cavity. The light ray 30 shows the reflections between the end of the laser 10 and the diffraction grating 11. The collimator 16 collimates the light in the resonance cavity. The output of the laser, which has its frequency set by the wavelength of the light in the resonance cavity, is collimated by the collimator 17 and is represented by a ray 35. Collimators 16 and 17 are quarter-pitch GRIN lens under the registered trademark "Selfoc" by Nippon Sheet Glass America, Inc. of Clark, N.J.

Figure 2:
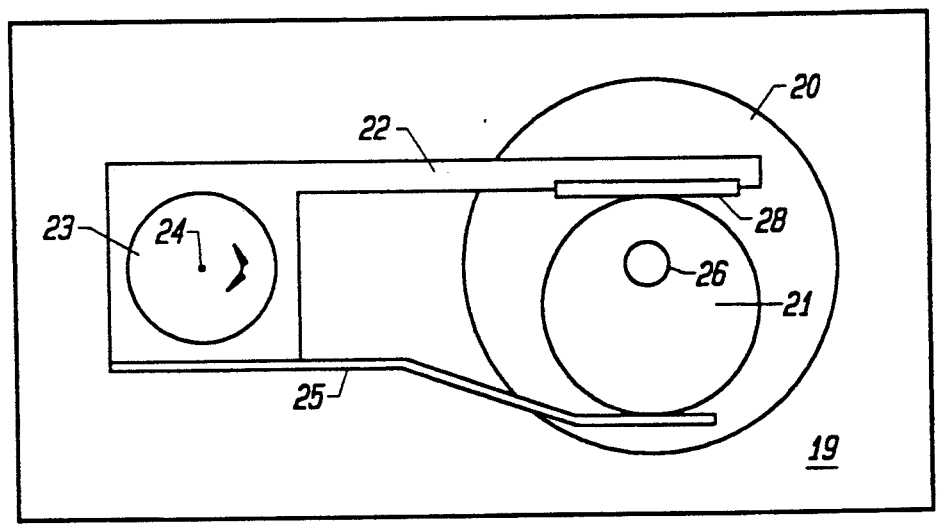
FIG. 2 is a detail of the stepper motor and follower arm for the grating sub-assembly of FIG. 1.

FIG. 2 is a detailed drawing of the sub-assembly which rotates the grating 11. The grating 11 is mounted to a base 23, which pivots with respect to the base 19. The grating 11 is mounted so that the axis about which the base 23 pivots, indicated by the reference numeral 24, is set at the center of the reflecting face of the grating 11. A follower arm 22 fits around pivoting base 23 and is fixed to the base 23 by a screw (not shown). The follower arm 22 resiliently presses against a cam 21 through the action of a leaf spring 25, which is mounted on the arm 22. The spring 25 engages the cam 21 opposite the arm 22. A lithium niobate crystal 28 is mounted to the follower arm 22 where it contacts the cam 21. The crystal 28 is flat polished to provide a smooth surface for the movement of the cam 21 against the follower arm 22.

The cam 21 is attached to a shaft 26 of a stepper motor 20, which is mounted to the housing 19. Most of the described assembly is made from gold-plated brass, except for the spring 25, which is made stainless steel, and the flat crystal 28 of the follower arm 22.

The operation of the stepper motor 20 rotates the cam 21 about the axis 26. As the cam 21 rotates, the follower arm is displaced with respect to the axis 26. With the movement of the follower arm 22, the base 23 pivots about the axis 24 and the grating 11 rotates. In this manner, the resonance cavity may be tuned.

Figure 3:
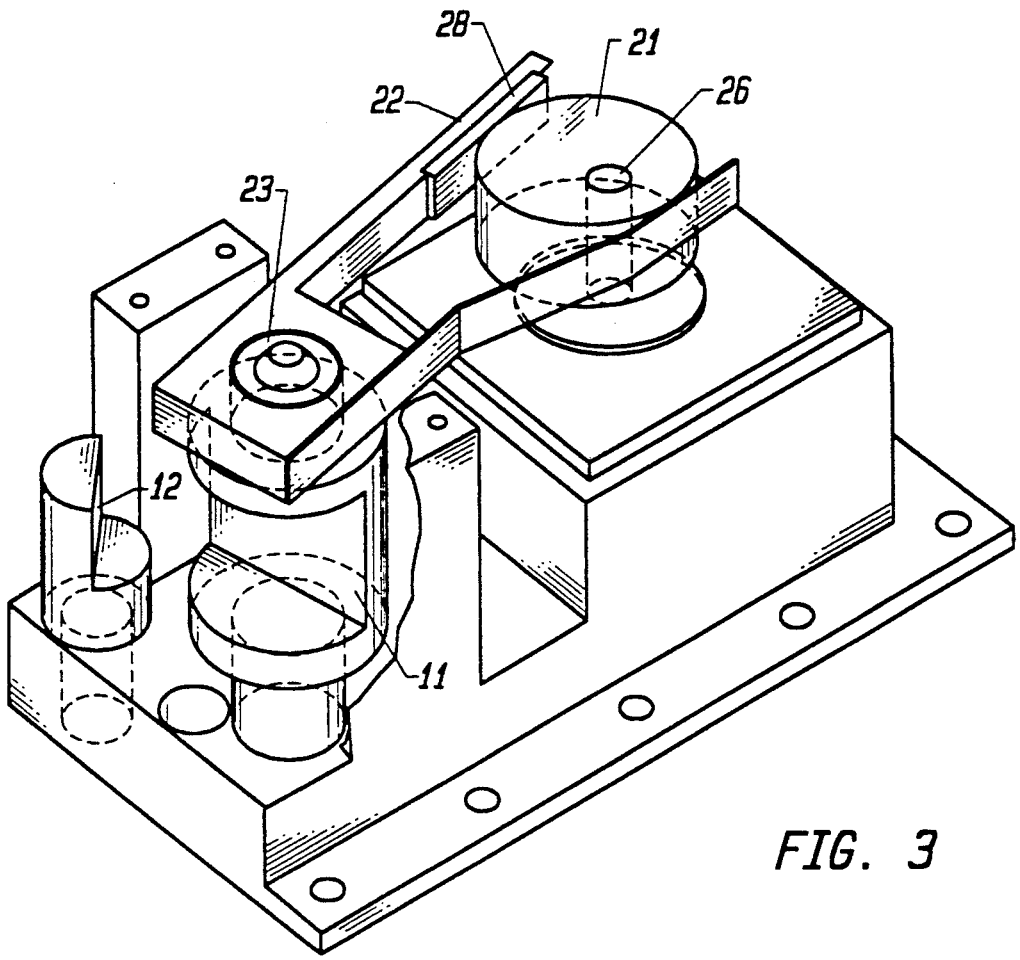
FIG. 3 is a perspective view of the sub-assembly of FIG. 2.

FIG. 3 is a perspective view of the sub-assembly with cam 21, follower arm 22 and grating 11. The stepper motor 20 which rotates the cam 21 by a motor housing 29. Also shown is the mounting for the mirror 12.

Figure 4:
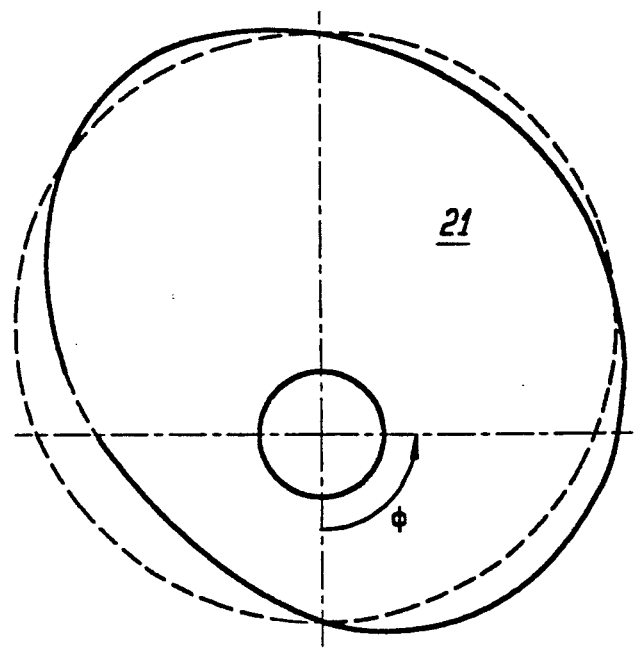
FIG. 4 is a detail of the cam of the FIG. 2 sub-assembly.

FIG. 4 is a detailed top view of the cam 21. It is specially shaped with respect to the axis 26 such that as the cam 21 rotates and the follower arm 22 moves, the rotation of the base 23 is equal for each step of the motor 20 at any operational angle of rotation of the cam 21. The shape of the cam 21 is defined by the equation:

$$r(mm) = 4.5 + 5.2 \, (\phi/180°)$$

where r is the radius from the center of the shaft of the stepper motor 20 and $\phi$ is the angle from 0° to 180°, as shown in FIG. 4. The section of the cam 21 for $\phi$ from 180° to 360° is not used by the follower arm 22 for determining the angular position of the grating 11. For purposes of shape comparison, a circle is shown by a dotted line.

Figures 5A, 5B:
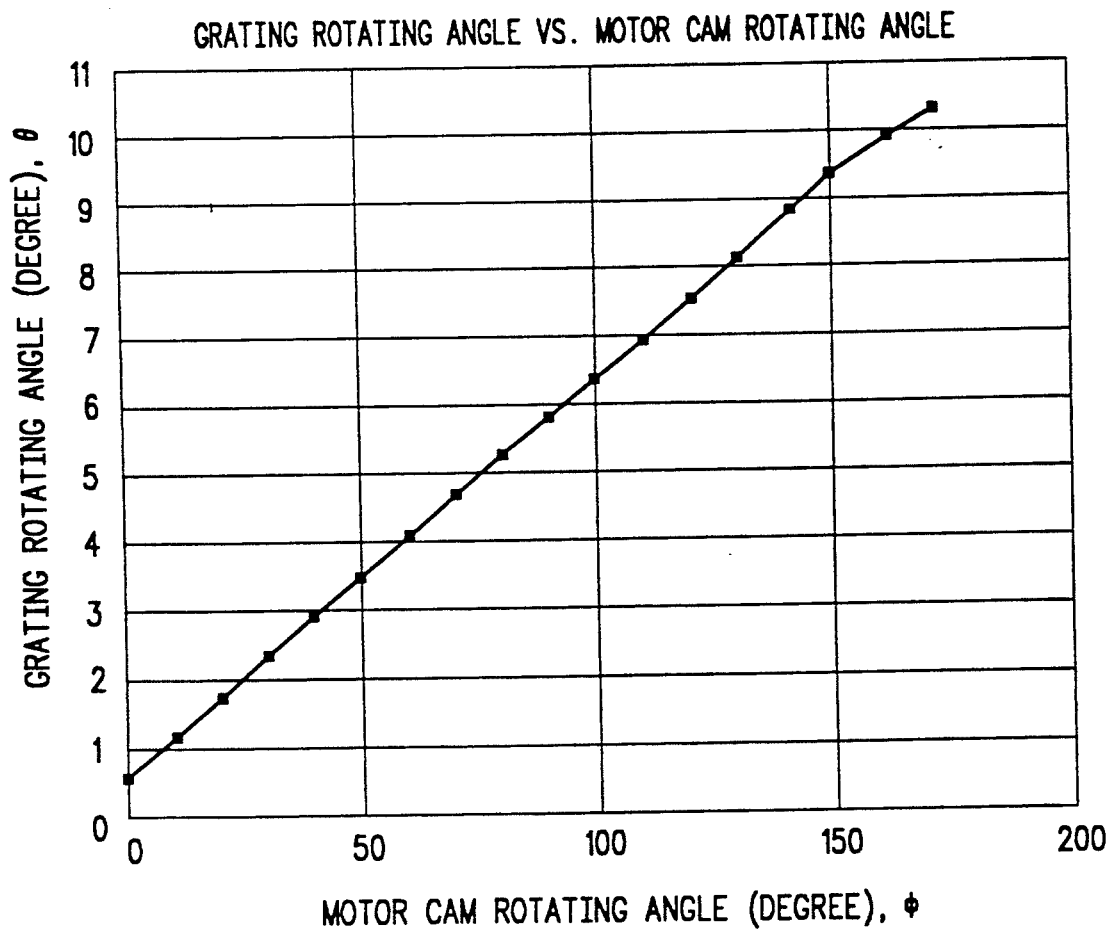
FIG. 5A is table of the rotation of the grating with respect to the rotation of the stepper motor with the cam of FIG. 4.
FIG. 5B is a graph plotting the values of the FIG. 5A table.

With a predetermined length for the follower arm 22, the net effect of this coupling between the stepper motor 20 and the grating 11 is that a complete rotation of the stepper motor permits the grating 11 to pivot about the axis 24 in a 10° range, i.e., ±5° about a predetermined reference point. Thus a resolution is provided of 6400 steps per 10° of rotation or, extrapolating to one complete revolution, 115,200 steps for 360°. Thus the movement of the stepper motor has become finely controlled. Furthermore, as the table in FIG. 5A indicates and the graph in FIG. 5B shows, there is a linear relationship between the rotation of the stepper motor 20 (angle $\phi$) and the rotation of the grating 11 (angle $\theta$).

To calibrate the position of the grating 11, the present invention also provides a sub-assembly of mirrors 12, 13, 14 and the photodetector 15. This sub-assembly provides a reference point with which to calibrate the position of the grating 11. The mirrors 12, 13 and 14 are arranged in a more or less rectangular arrangement, which correspond to the corners of the enclosure for the complete assembly. The mirrors are arranged such that when the grating 11 is rotated to form a resonance cavity at a particular wavelength, some of the light from the laser 10 is also reflected by the grating 11 toward the mirror 12, as shown by the ray 31. The light striking the mirror 12 is reflected toward the mirror 13, illustrated by the ray 32.

In turn, the mirror 13 reflects the light along the ray 33 toward the mirror 14, which reflects the light toward the photodetector 15 along the ray 34. This arrangement of mirrors provides for a long optical path such that the angle subtended by the photodetector 15 with respect to the rotation of the grating 11 is reduced, as compared to a direct reflection by the grating 11 into the photodetector 15. With the described sub-assembly, the total path of the light is nearly a third of a meter in an enclosure having dimensions slightly more than 10 cm by 6 cm. This allows for a very accurate placement of the reference point.

The calibration operation is as follows. The grating 11 is rotated to reflect light into the photodetector 15. The output of the photodetector 15 is connected to a generates an output which is fed into an input of a comparator (not shown), which has a second input connected to a predetermined reference voltage. When the light reaching the photodetector 15 reaches a predetermined level, the comparator generates an output signal indicative of the reference point. Having selected the reference point, the assembly controller 50 then steps the motor 20 for one complete revolution as a check of the calibration. The assembly is ready for operation. It should be noted that the stepper motor 20 is always moved in the same direction to avoid any play in the mechanical coupling between the motor 20 and the grating 11.

The assembly controller 50 is a microcontroller, such as a HD64180 from Hitachi Corporation of Tokyo, Japan. The programming of such microcontrollers and the connections between the microcontroller 50 and the stepper motor 20 are known to those in the electronics system design field. After first initializing itself, the microcontroller 50 recalibrates the position of the grating 11.

Thus the present invention provides for a tunable laser assembly which permits very fine tuning by the stepper motor alone of the light emitted by the laser. As part of the fine tuning, the assembly has a calibration system which provides for a highly precise reference point for the tuning of the laser. All these advantageous features are packed into a small unit for easy placement.

While the above is a complete description of the preferred embodiments of the present invention, various alternatives, modifications and equivalents may be used. It should be evident that the present invention is equally applicable by making appropriate modifications to the embodiment described above. Therefore, the above description should not be taken as limiting the scope of invention which is defined by the metes and bounds of the appended claims.

What is claimed is:

1. An assembly for tuning a laser mounted to a base, comprising
   a stepper motor mounted to said base, said motor having a rotatable shaft;
   means, responsive to control signals and connected to said stepper motor, for controlling rotation of said stepper motor shaft;
   a cam mounted to said stepper motor shaft;
   a grating rotatably mounted to said base and positioned with respect to an end of said laser to form an tuning cavity therewith; and
   a follower arm in fixed relationship to said grating and biased against said cam;
   whereby said cavity is tuned to vary the output of said laser by rotating said grating in response to said control signals.

2. The assembly of claim 1 wherein said follower arm has a spring arm extending therefrom, said follower arm and said spring arm engaging said cam therebetween to resiliently bias said follower arm against said cam.

3. The assembly of claim 1 wherein said cam is shaped so that said follower arm is displaced from said stepper motor shaft in a linear relationship with respect to the angle of rotation of said shaft.

4. The assembly of claim 3 wherein the length of said cam follower arm is defined and said cam is shaped so that said grating rotates in a very small angular range compared to a full rotation.

5. The assembly of claim 4 wherein said grating rotates in a range of 10°.

6. The assembly of claim 1 further comprising means for calibrating said assembly.

7. The assembly of claim 6 wherein said calibrating means comprises a light detector connected to said controlling means and a plurality of mirrors mounted to said base, said mirrors arranged to form a reflective path for light from said grating to said detector when said grating is rotated to a particular position, said detector generating an output signal to said controlling means indicative of a calibration point for said grating.

8. The assembly of claim 7 wherein has three mirrors arranged to form corners of a rectangle with said light detector.

9. In an assembly having a laser mounted to a base, said laser capable of being tuned by rotation of a grating forming a resonance cavity with an end of said laser and a rotatable grating, a subassembly for calibrating the angular position of said grating, comprising a light detector mounted to said base; and a plurality of mirrors mounted to said base, said mirrors arranged to form a reflective path for light from said grating to said detector when said grating is rotated to a particular position, the reception of light by said detector indicative of a calibration point for said grating.

10. The subassembly of claim 9 wherein said plurality of mirrors comprises three mirrors arranged to form corners of a rectangle with said light detector.

11. In an improved assembly having a laser mounted to a base, a grating rotatably mounted to said base, said laser capable of being tuned by the rotation of said grating forming a resonance cavity with an end of said laser and said rotatable grating, the improvement comprising a stepper motor mounted to said base, said motor having a rotatable shaft;

means, responsive to control signals and connected to said stepper motor, for controlling rotation of said stepper motor shaft;

a cam mounted to said stepper motor shaft; and a follower arm mounted to said grating and biased against said cam;

whereby said cavity is tuned to vary the output of said laser by rotating said grating in response to said control signals.

12. The improved assembly of claim 11 wherein said follower arm has a spring arm extending therefrom, said follower arm and said spring arm engaging said cam therebetween to resiliently bias said follower arm against said cam.

13. The assembly of claim 11 wherein said cam is shaped so that said follower arm is displaced from said stepper motor shaft in a linear relationship with respect to the angle of rotation of said shaft.

14. The assembly of claim 13 wherein the length of said cam follower arm is defined and said cam is shaped so that said grating rotates in a very small angular range compared to a full rotation.

15. The assembly of claim 14 wherein said grating rotates in a range of 10°.

* * * * *